Jan. 5, 1965 R. E. MILFORD 3,164,771
APPARATUS FOR CENTRAL RECORDING OF REMOTE METER DATA
BY PERIODIC AND SEQUENTIAL METER INTERROGATION
Filed Dec. 8, 1960 3 Sheets-Sheet 1
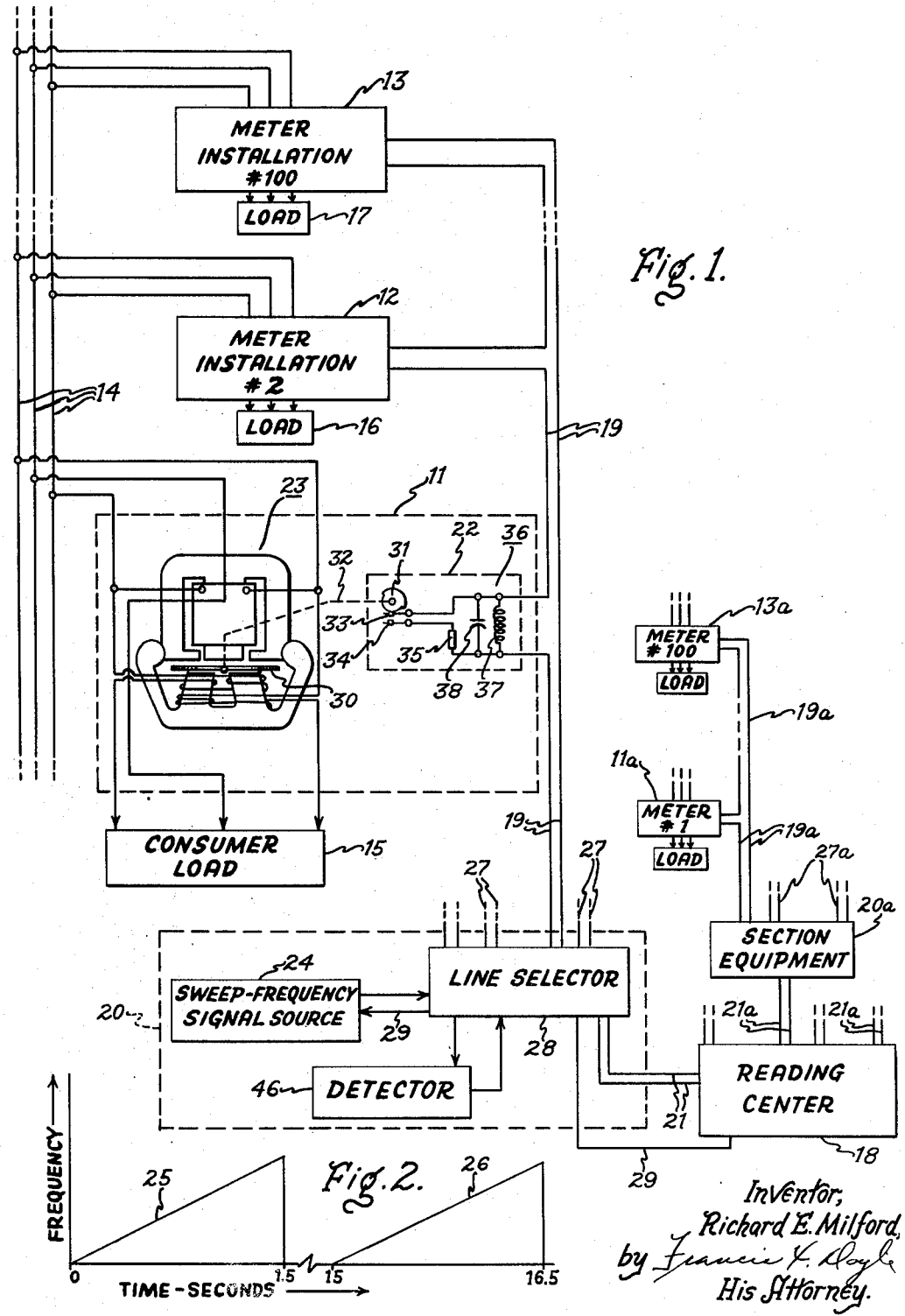
Inventor,
Richard E. Milford,
by Francis K. Doyle
His Attorney.

Jan. 5, 1965  R. E. MILFORD  3,164,771
APPARATUS FOR CENTRAL RECORDING OF REMOTE METER DATA
BY PERIODIC AND SEQUENTIAL METER INTERROGATION
Filed Dec. 8, 1960  3 Sheets-Sheet 2
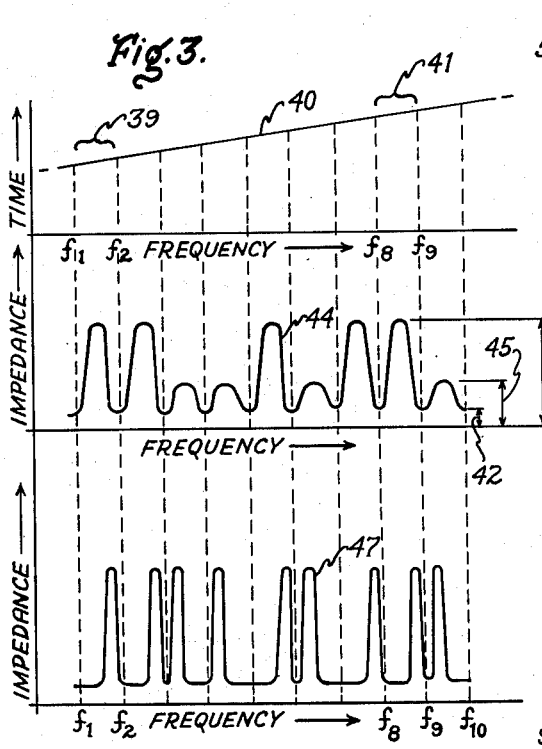
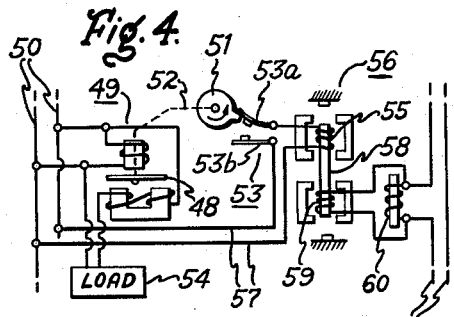
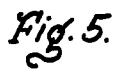
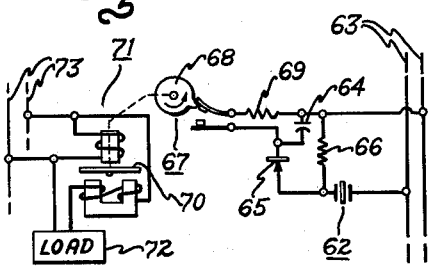
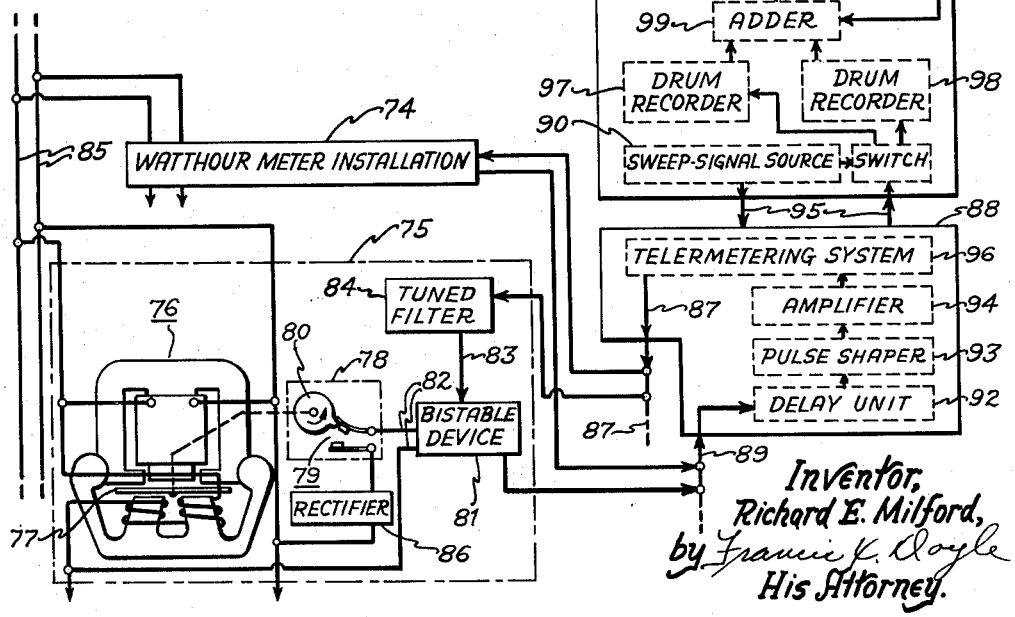
Inventor,
Richard E. Milford,
by Francis K. Doyle
His Attorney.

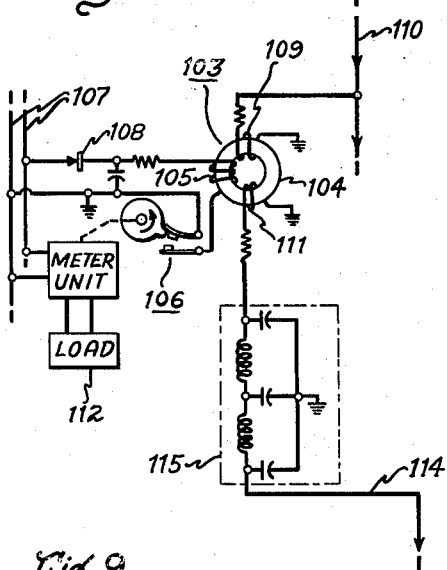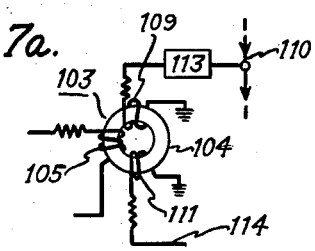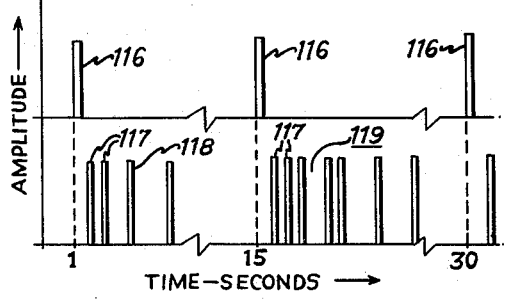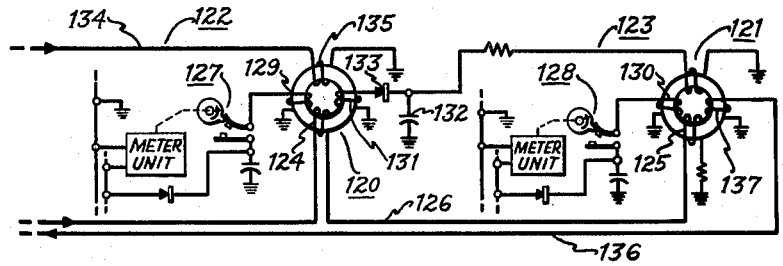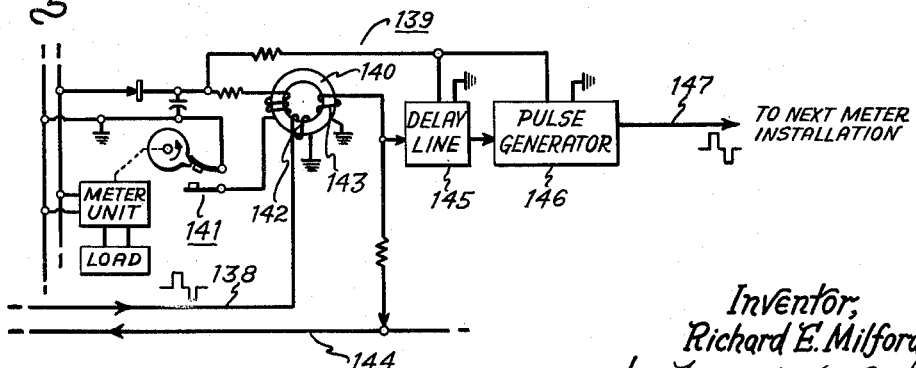

United States Patent Office

3,164,771
Patented Jan. 5, 1965

3,164,771
APPARATUS FOR CENTRAL RECORDING OF REMOTE METER DATA BY PERIODIC AND SEQUENTIAL METER INTERROGATION
Richard E. Milford, Phoenix, Ariz., assignor to General Electric Company, a corporation of New York
Filed Dec. 8, 1960, Ser. No. 74,728
18 Claims. (Cl. 324—113)

The present invention relates to improvements in metering, and, in one particular aspect, to automatic reporting of measurement data uniquely developed by household utility meters responsive to high-speed periodic electrical interrogation signals.

In the utilities industries, traditional practices for the billing of consumers have involved laborious calculations based upon reports by visiting meter readers, each increment of the consumption totalized by each household meter being assessed at a uniform step rate, and the readings themselves being taken at infrequent intervals of a month or more. The labor costs incident to such readings and to the related human processing of such data are inescapable burdens which both the producer and consumer have been obliged to accept in the absence of more economical alternatives of equal reliability. Moreover, it is commonly the case that different increments of the production and consumption of electrical power are of significantly different economic value, such that those who consume under prevailing conditions most favorable to the supplier must nevertheless bear a disproportionately large share of the total cost when the rates for all uses are uniform. These have been the circumstances in the electric power industry, for example, where generating and distributing equipment may function most efficiently under prescribed loading conditions and it should therefore be economically attractive for both the utility and consumers that the consumption be increased when it falls below such loading and that it be curtailed, or at least be assessed at rates equitably offsetting the increased costs, when the optimum loading is exceeded. To some extent, the latter goal has been approached through the introduction of demand meters, such as those which register maximum kilowatt hour demand by the consumer in the interval between readings, the restrictions to or excesses over prescribed limits providing the basis for appropriately lower and higher charges. For kindred reasons, it has now also become the practice to activate household electric water heaters automatically such that their loads will be absorbed under optimum economic conditions. In any event, the costs, labors and errors of human readers are not eliminated, and the simple totalized meter registrations are devoid of information as to the consumer's demand at any given instant. Information of the latter type is important, however, not only for the billing purposes mentioned but also for the utility's purposes in planning to cope with widely varying instantaneous demand in the most effective and economical manner.

The present teachings involve radical departures from the prior techniques of integrating and reporting metered data, each meter being uniquely constructed to report automatically to a remote interrogation center a distinctive electrical binary characterization of whether or not its integrations have reached a small critical predetermined amount within a predetermined short period, and each meter being responsive to periodic electrical interrogation signals of distinctive frequency applied from the remote interrogation center at a high repetition rate. Storage of the binary information at the remote center permits integrations accurate to within the small predetermined amount to be achieved automatically whenever desired, obviating the needs for meter readers and for any long-term integrations and visible registrations whatsoever at the consumer's site. Accurate and current demand information is inherently characterized by the data accumulated in this manner, and such information therefore presents itself for use in programming of operations by the utility and for automatic billing computations based upon more accurate complex rate structures.

Accordingly, it is an object of the present invention to provide novel and improved automatic metering involving high-speed periodic electrical interrogations of utility meters for remote storage and data-handling purposes.

Another object is to provide an improved automatic reading and billing system for an electrical power network which obviates the need for meter reading at consumer locations and which registers demand on a substantially continuous basis, the system being adapted to manufacture, installation and operation at relatively low cost.

A further object is to provide an automatic reading and billing system for an electrical power network wherein each consumer's watthour meter installation is electrically interrogated periodically and within critical short intervals to report its successive integrations of electrical power consumptions up to a predetermined small amount.

It is a still further object to provide improved electrical watthour metering equipment for automatic reading and billing systems which integrates successive consumptions of power up to a predetermined amount by a consumer and serves as a two-state storage cell exhibiting distinctive electrical responses to electrical interrogation signals applied simultaneously to a number of such consumer equipments.

By way of a summary account of practice of this invention in one of its aspects, each of a group of electrical watthour meter installations at neighboring consumer sites includes a unique signalling stage which is coupled with a remote reading center by a communications link, the link preferably being in the form of one wired line into which the meter signalling stages are coupled in series. A power-responsive stage at each meter installation comprises a conventional basic watthour meter element, such as the motor element of an induction watthour meter, which rotates a pivoted conductive disk at an angular velocity proportional to the electrical power drawn by the consumer from the usual power lines. The rotatable disk of the power stages is coupled with the signalling stage to actuate a switching device alternately from one to the other of two stable conditions each time the disk has turned through a predetermined angle in response to the flow of a predetermined small increment of power to the consumer's load. Within the signalling stage, a frequency-sensitive element controlled by the switching device exhibits one or another electrical characteristic identifying the instantaneous conditions of the switching device, and this frequency-sensitive element communicates its characteristic to the reading center each time a periodic interrogation signal of a particular frequency is applied to the signalling stage from the reading center. Preferably, the interrogation signal comprises one distinctive narrow band of frequencies in a periodically-recurring sweep frequency signal issued by the reading center, the narrow band of frequencies being passed to the related meter by a selective filter in its signalling stage, and the frequency-sensitive element simultaneously reflecting one or another impedance back to the reading center to characterize whether or not the load has absorbed the increment of power during the interval between interrogations. The interrogation interval is kept short enough so that, at maximum rate capacity, the consumer's load cannot draw more than one increment of energy between successive interrogations, and the increment of energy is governed by the minimum resolution which is acceptable in metering. A 200 watthour resolution is satisfactory in the case of common 240 volt, 3-wire 200 ampere power circuitry, and the corresponding period between successive interrogations is then reduced to a maximum of only fifteen seconds. Similarly a one kilowatt hour resolution could be used, since this is the usual billing unit. In such case, the period between successive interrogations would be seventy five seconds. At the reading center the simple binary coding signals from the meter installations are memorized and identified magnetically, or by other recording means, and the reported successive increments of energy are totalized to provide demand readings for a suitable longer interval, such as an hour. A further magnetic or other type of storage is then made of the demand readings, identified as to the related meters and applicable rates, and computations are made automatically for billing purposes from such stored information at the end of the monthly billing period.

Although the aspects of this invention which are believed to be novel are set forth in the appended claims, the details of preferred embodiments and practices of the invention, and the further objects and advantages thereof, may be most readily comprehended through reference to the following description taken in connection with the accompanying drawings, wherein:

FIGURE 1 portrays automatic meter reading and computation equipment for an electric power distribution system in which the present invention is practiced, the illustrations being partly in schematic and partly in block form;

FIGURE 2 depicts the wave form of periodic sweep-frequency interrogation signals applied to meter installations in the FIGURE 1 apparatus;

FIGURE 3 comprises a set of wave forms in which interrogation signal frequency variations are related to electrical pulse outputs of meter installations;

FIGURE 4 is a schematic diagram of an automatic-reading meter installation in which a magnetostrictive element aids in producing a distinctive digital output signal;

FIGURE 5 is a schematic diagram of a digital automatic-reading meter installation in which a piezoelectric crystal provides frequency selectivity;

FIGURE 6 portrays an alternative form of high-speed meter reading and computation equipment in which meter data is converted to digital form for remote integration and processing through use of bistable electrical devices;

FIGURE 7 is a schematic diagram of an automatic-reading meter installation in which the state of a wound magnetic core component characterizes meter data;

FIGURE 7A is a schematic diagram similar to FIGURE 7 and showing a second embodiment of that form of the invention;

FIGURE 8 graphically represents pulse interrogation signals in timed relationship to pulse output signals of other forms of high-speed remote meter-reading equipment;

FIGURE 9 is a schematic diagram of digital automatic-reading meter installations in which bit information is read out and transferred toward processing equipment through a shift register stage in each meter installation; and FIGURE 10 is a schematic diagram of a digital automatic-reading meter installation in which bit information is read out and a triggering output signal for the next-succeeding meter is provided by chain-reaction circuitry.

The equipment depicted in FIGURE 1 is designed for use with a number of electrical distribution sections each including one hundred consumer electric meter installations, of which those identified by reference characters 11, 12 and 13 represent the first, second and last of one such section. Three-wire service lines, 14, make the customary 240-volt, 200-ampere, single phase power available to the respective consumer loads 15, 16 and 17 through these meter installations. As will become apparent from descriptions following later herein, the section of one hundred, or another suitable number, of meter installations represent groupings which are advantageous for automatic reading purposes, and the power-service lines themselves are independent of this and may be connected with the loads and meter installations according to any desired program. While the prior practice has been for readers to visit each household location and to record the visible integrated registrations of power consumptions during the interval since the last such visit, this is entirely avoided in the FIGURE 1 equipment by automatic electric reporting of measurement conditions at each meter to memory and computation apparatus of known forms in a reading center 18 which is at a remote location such as a utility company office where customer demand and billing information is ordinarily processed. For these purposes, signalling stages of all meter installations in any section are coupled together, and with the reading center, by a wired line 19, remote section apparatus 20, and a communications link 21 which may also conveniently comprise a two-wire line. The signalling stage 22 of meter installation 11 is shown to include cam-operated switching contacts and electrical circuit components, and the associated power-responsive watthour meter structure devoid of the usual visual register mechanisms. Each of the other installations is similarly constructed, and their respective signalling stages are thus serially coupled in line 19 independently of the power service.

At a remote location, such as that of section apparatus 20, a known form of master source, 24, of sweep-frequency interrogation signals develops an output of constant-amplitude signals which periodically vary substantially linearly in frequency across a predetermined range of frequencies. The frequencies involved are such that one hundred simple low-cost tuned filters may each respond distinctively to different narrow bands of frequencies within the overall range of frequencies swept by the source within 1.5 seconds, the repetition rate at which the sweep frequency signals are delivered to any section being ten times as long, i.e. 15 seconds. This is the characteristic presented graphically in FIGURE 2, wherein the frequency vs. time plots 25 and 26 are of successive interrogation signals applied from this source to the signalling stages of meter installations associated with line 19. Section apparatus 20 serves not only the interrogation line 19 of the illustrated section, but up to nine additional lines, 27, associated with other sections each including one hundred meters. The 15-second periodicity of the sweep-frequency signals is significant in the interrogations, and it is intended that each of the interrogation lines shall receive a burst of such signals, over a different frequency range, each 15 seconds. Accordingly, where section apparatus 20 serves ten such pairs of lines, each is interrogated only for a different 1.5 second interval during the repetition period. While source 24 delivers ten bursts of output signals like that of plot 25 over the entire 15 second period, each pair of the interrogation lines witnesses only one distinctive 1.5 second portion of it, as controlled by a line selector 28. The latter may comprise any suitable known form of selector switch, such as a mechanically-actuated stepping switch or an electronic switch, the operation of the selector being appropriately synchronized with both the operations of the sweep-frequency source and of memorizing and computing equipment in the reading center by synchronizing command signals applied by couplings 29, so that each section line receives only its intended share of the sweep signals and so that the information reported back to the reading center can be identified with each meter installation in each section. Of course it will be understood that where a 75 second period is used either the length of the interrogation signal could be longer, or more interrogation lines could be utilized in the section. Alternatively, of course, the sweep-frequency range may be caused to embrace a range sufficient to excite distinctively each of the meter installations of all the sections, thereby eliminating need for a line selector, although it is then necessary to accommodate a wider frequency spectrum in the system and to tune all the meter signalling stages in all sections to different frequencies.

As each sweep-frequency signal is applied to a section interrogation line, the meter installations each respond, according to the distinctive tuning of their signalling stages, by exhibiting one of two possible distinctive electrical characteristics which constitute a binary coding of whether or not the associated power-responsive stage has integrated a small predetermined amount of power flow to the associated consumer load since this last occurred. For this purpose each induction watthour meter unit, such as the unit 23, need only signal that it is in one or the other of two alternative measurement states, and this is conveniently achieved by having the usual conductive disk 30 rotate the switching cam 31 through a suitable mechanical coupling 32. While the customary register may also be connected with the disk, for visual checking or in cases where existing meters are converted for practice of the present teachings, this is not essential. Without such a register, and where the cam possesses two different lobes of about equal arcuate span, the meter unit 23 first closes the associated switch contacts 33 and 34, holding them closed until the predetermined flow of power to load 15 has been integrated, and then opens these contacts and permits them to remain opened until another succeeding increment of power flow of the same amount has been integrated, and so on. Alternatively, the disk-actuated cam may have only a small projection which triggers a ratcheting type of switch which remains open or closed until triggered to the opposite condition. The meter unit and switching elements thus constitute a bistable assembly, and the measurment integrations are only up to a very small predetermined amount of power, the integrations being repeated in immediate succession as power is delivered to the load. The value of this predetermined small amount of power is chosen in relation to the interval between interrogations, the maximum rated capacity of the service to associated load, and the minimum acceptable resolution of data in the system. By way of example, a 200 watthour increment of power is one which will afford satisfactory resolution of data, i.e., the data is considered accurate enough if it is within 200 watthours of the exact amount, and an appropriate interrogation interval for a 240-volt 200-ampere consumer power line is then 15 seconds. Fifteen seconds represents the shortest period within which the load on such a consumer power line could draw 200 watthours of energy, calculated as follows:

$$\frac{200 \text{ watthours} \times 3600 \text{ seconds/hour}}{240 \text{ volts} \times 200 \text{ amperes}} = 15 \text{ seconds}$$

Therefore, switch contacts 33 and 34 are alternately preserved closed until 200 watthours are consumed by the load, being opened at that instant, and then held open until the next 200 watthours have been consumed, being closed at that instant for repetition of these cyclic switching changes. Meanwhile, successive frequency-swept interrogation signals such as those of plots 25 and 26 are applied to the signalling stage 22 over lines 19 every 15 seconds, it being apparent that the switch contacts may either remain in an open or closed state or change from one to the other state in the interval between successive signals, but in no event change its state twice in such an interval. Obviously, the above computations for a one kilowatt hour increment would yield a period of 75 seconds.

As has been noted, each signalling stage must distinctively characterize the open or closed state of its switch contacts and thereby provide a binary coding for data handling purposes at the reading center 18. This is achieved by placing the series combination of the switching contacts 33 and 34 and an impedance 35 in parallel with a tuned circuit 36, shown as including inductance 37 and paralleled capacitance 38, which is in series with the section interrogation line 19. The tuning of circuit 36 alone, without impedance 35 in parallel connection, is to within a narrow band of frequencies, such as the band 39 between frequencies $f_1$ and $f_2$ in FIGURE 3, comprising a distinctive one-hundredth of the range of R.F. frequencies swept by an interrogation signal 40 applied to line 19. The corresponding tuned circuits of the signalling stages of the remaining meter installations in the same section coupled by line 19 are similarly distinctively tuned, a further tuning band 41 of one of these being designated between frequencies $f_8$ and $f_9$ in FIGURE 3. It is a characteristic of such parallel tuned circuits that they each exhibit a peaked high impedance when encountering the frequency to which they are tuned, and, as the frequency of interrogation signals applied to these circuits in the section is swept across the full range, each of these serially-coupled circuits presents its high impedance to the common line 19 when its resonant frequency is met. At such times, those circuits from which the interrogation signal is instantaneously detuned exhibit only a low level of impedance, such as pedestal level 42 in FIGURE 3. Referring to this same figure, the higher peak impedances of level 43 in the plot 44 represent the electrical impedance characteristics witnessed by line 19 with changing interrogation signal frequency for those tuned circuits which are not shunted by their associated switch contacts. The lower levels of peak impedances 45 characterize those meter signalling stages in which the associated switch contacts are closed as their distinctive interrogation signal frequencies are passed, in those instances where the paralleled impedances such as impedance 35 are predominantly or wholly resistive. Of course it will be understood that tuned circuit 36 could be a series tuned circuit in which the inductance 37 and capacitance 38 are in series with each other. Detector 46, FIGURE 1, responds to the impedance characteristics to produce output signals, such as distinctive D.-C. signals, which signify whether each meter installation displays one or the other of its two states when interrogated. It is of course unnecessary that the meter installations respond in sequence corresponding to their order along the distribution service line 14; each is instead identified by its responses as it is being interrogated by a particular narrow band of frequencies. This detector may include a known form of impedance-responsive device such as a bridge or may be sensitive to the attendant voltage drops in the section line, or the like. Its outputs, preferably in electrical pulse form, are delivered to the reading center 18 where they are memorized in accordance with known techniques, preferably upon a magnetic medium, or a thermo-plastic medium, the sequences of their occurrence being established by the tunings of the corresponding meter installations and thus providing an identification. Simple comparison of succeeding bits of data received in this manner from any given meter installation indicates whether or not the associated consumer load has used 200 watthours. Each such use thus appears at the reading center, where in known ways it is detected, recorded and made available for billing computations at the end of certain intervals and for indications of consumer demand and for billing on any suitable complex rate structure reflecting increased costs for demands above prescribed levels. The frequency-synchronized occurrence of digital bits of information from the sections, and the synchronized selection of information from various sections by line selector 28 permits the simple binary-coded data to be transmitted from the section equipment 20 to the reading center 18 over the simple single-channel communication link 21, which may comprise one pair of wires or another equivalent communications link. Other comparable section equipments, such as that designated by reference character $20_a$, coupled with section-meter installations $11_a$ and 13ₐ over lines 19ₐ and with other meter installations over lines 27ₐ, also cooperate with the reading center 18 in the same manner by way of links 21ₐ.

The signalling stages of the meter installations may be distinctively detuned in their responses to the interrogation signals, rather than being shunted by resistances to exhibit different levels of impedance. Impedance 35 in such instances is capacitive or inductive and thereby shifts the frequency tuning of circuit 36 by a small amount as it is paralleled with it upon closure of the switch contacts 33 and 34. Alternatively these switch contacts may function to short out a portion of inductance winding 37, for the same purpose. The effect of such detuning is to cause the impedance curve, and consequently the attendant voltage characteristic, to occur within either the lower or higher half of any frequency band, such as that between frequencies $f_1$ and $f_2$ in FIGURE 3, the peak responses in the related curve 47 being sharpened by use of high-Q tuned circuitry and the peak levels of the responses being substantially the same. Whether the peaked response of any meter installation occurs within the first or second half of the related narrow band of frequencies then characterizes whether the meter-operated switch is in the one or the other of its open and closed states. This simple binary-coded information is detected in accordance with either the existing frequency or with the time of its occurrence, which is also related to the sweep frequency. The coding pattern appearing in plot 47, FIGURE 3, is based upon downward frequency detuning of each signalling stage as its associated switching contacts are closed, whereby the signalling information is in agreement with that of the co-ordinated plot 44 in the same figure where the lower level pulses represent a resistive shunting of the tuned circuits.

The tuned circuit elements of meter signalling stages may advantageously be of constructions other than the simple paralleled or series capacitance and inductance already discussed. In FIGURE 4, for example, the disk 48 of a schematically-illustrated induction watthour meter unit 49 used with a 2-wire service 50 drives a triggering cam 51 through coupling 52 to close switch 53 when each successive 200 watthour increment of energy is delivered to load 54. Switch 53 is shown in the simple form of an impact switch in which a flexible switch blade 53a can momentarily contact another switch element 53b when it drops from the cam projection and springs over-center momentarily. Each switch closure connects power from service lines 50 to one winding 55 of a double solenoid 56 over lines 57, and thereby causes the solenoid slug 58 to be drawn in one direction such that the other winding 59 maintains a low impedance. At its distinctive resonance frequency, the impedance of a magnetostrictive ferrite core winding 60 in parallel with winding 59 offers a high impedance to the section interrogation line 61, but the low impedance of the winding 59 which follows each closing of switch 53 causes this signalling stage to report its low impedance to the associated section equipment. Simultaneously, however, the energy of the interrogation signal appearing in solenoid winding 59 causes the slug to move subsequently in the opposite direction, restoring a high impedance to the signalling stage as it appears to the interrogation line. If upon the succeeding interrogation the load 54 has not drawn 200 watthours of energy, the signalling stage reflects only the higher impedance; otherwise, it displays the lower impedance in the manner explained. This constitutes the desired coding, which may be processed as described in connection with the FIGURE 1 system.

In the meter installation of FIGURE 5, a piezoelectric quartz crystal 62 constitutes the wanted frequency-sensitive circuit element, and is proportioned to resonate at a distinctive frequency in response to sweep-frequency interrogation signals appearing on section interrogation line 63. The series resonant mode of the crystal is used, whereby upon occurrence of the desired frequency band within the interrogation signal range the capacitor 64 becomes charged through diode 65. A temporary low-impedance shunting occurs across the line 63 until capacitor 64 has been charged, when the impedance is then high corresponding to that of the high resistance 66. The capacitor retains its charge, and causes the signalling stage to exhibit a high peak impedance until the meter switch 67 is momentarily closed by cam 68, whereupon capacitor 64 discharges through dissipating resistance 69. Cam 68, or its equivalent, is actuated by disk 70 of the induction watt-hour unit 71 to impulse switch 67 to closure each time the consumer load 72 absorbs another 200 watthours of energy from the service lines 73, whereby the desired binary coding of whether or not this (or some other) increment of energy has been consumed since the next-prior interrogation is achieved in terms of a high or low impedance across lines 63 as a particular narrow band of frequencies is applied in section interrogation.

The system representation in FIGURE 6 likewise includes section meter installations, such as 74 and 75, each of which may involve an induction watthour unit 76 having its conductive disk 77 in driving relation to a switching device 78, preferably in the form of a switch 79 which is actuated to closure momentarily by a cam 80. A bistable device 81 in its signalling stage responds to both signals applied through the switching device 78 over lines 82 and to address signals via coupling 83 from a tuned filter 84. The bistable device 81 may conveniently comprise a known magnetic core storage device or a bistable semiconductor unit, such as a double-base diode circuit. Devices of this character remain in the first of two distinctive states until switched to the second by an impulse, which in the illustrated circuitry is a D.-C. pulse produced by switching device 78 utilizing the service mains 85 as a source in conjunction with a rectifier 86. Tuned filter 84 delivers readout signals to the bistable device 81 upon receiving a distinctive narrow band of frequencies from repetitive sweep-frequency interrogation signals applied to the installation by way of interrogation line 87 from section equipment 88. The operation is in these respects similar to that outlined in relation to the system of FIGURE 1. Upon being addressed by the read-out signals, the bistable device is automatically switched from its second state back to the first, if it had been placed in the second state by operation of the meter switching device 78, and, in this process, yields an output pulse to the line 89 coupling the meter installations with the section equipment 88. No such output pulse is occasioned unless the bistable device has been changed from its first to second states by meter recognition that a predetermined increment of energy had been delivered to the load since the last such occurrence. Sweep frequency source 90 for the interrogations is in this system shown at the reading center 91, and the repetition period witnessed at each meter installation is preferably of about 15 seconds. Where necessary to coordinate the pulse outputs on line 89 with the applied sweep-frequency interrogation signals for purposes of distinctively identifying the information from each meter installation, a delay unit 92, pulse shaper 93, and amplifier 94, all of known forms, are interposed before the binary-coded pulse data is telemetered back to the reading center 91 over a communications link 95 by the telemetering system 96. At the reading center, the pulse coded section data is alternately applied to a first magnetic drum recorder 97 during one 15-second period and to a second similar drum recorder 98 during the succeeding 15-second period while the first drum is releasing its stored information to the adder 99, and vice versa. Each recording drum is provided with a number of recording and reproducing heads corresponding to the number of metering sections in the system, and each drum is speeded up to release its stored information at a multiplied rate, the multiplying factor being equal to the number of metering sections in the system. In this manner, all readings from the meter installations are properly registered in the reading center.

Loop tape recorder 100 cooperating with adder 99 contains binary-coded meter identification and the corresponding total count of consumed increments of energy for a selected demand interval, such as ¼ hour, ½ hour, or the like. Information received from the drum recorders is compared with the information for the previous 15-second period, and pulses are progressed to the adder to signify when energy increments have been consumed. At the adder, these pulses add one unit to the previous total, and the new total is recorded upon the magnetic tape of the loop tape recorder 100 at a distinctive location for the related meter installation. At the end of the selected demand interval, the loop tape recorder thus exhibits the demand for all consumers. Subsequently, this demand information, in binary number form, is progressed to a demand tape recorder 101, for storage, and is itself cleared for totalizing during the succeeding demand interval. Demand recorder 101 contains the demand information, recorded as a binary number, for all the meter installations according to their distinctive identification numbers. From this demand tape, information is applied to a computer tape or the like in the data processing equipment 102 which computes customer billing for a period such as a month, according to a predetermined rate structure.

Bistable device 103 which appears in the meter installation depicted in FIGURE 7 and FIGURE 7a includes a magnetic core 104 which may have its magnetization changed from the so-called "0" to "1" state by momentary pulses applied to its winding 105 through meter unit switch 106. The D.-C. voltage for this pulsing is conveniently derived from service mains 107 through a rectifier 108. Every fifteen seconds, an interrogation pulse is applied to read-out winding 109 from section interrogation line 110, and an output pulse is yielded by output winding 111 only if the core has been in the "1" state, indicating that the predetermined increment of energy has been delivered to load 112 since the last such occurrence. At the same time, the interrogation signal shifts the core magnetization to the "0" state if it finds the core in the "1" state, thereby readying the core for a subsequent registration. The desired interrogation pulse for readout winding 109 may be produced by a tuned filter, 113, as shown in FIGURE 7a, or alternatively, the interrogation signalling itself may comprise a pulse train having a 15-second repetition rate. In the latter instance, as shown in FIGURE 7, the output signals applied to the line 114 for return to the section equipment and the reading center must be characterized for identification other than by occurrence simultaneously with occurrence of a particular narrow band of frequencies. For this purpose, a delay line 115, including the customary inductive and capacitive elements, is interposed to shift the time occurrence of the output pulse in line 114 by a distinctive amount. The remaining meter installations are similarly equipped with delay lines introducing other distinguishing delays. In FIGURE 8, such periodic interrogation pulses, 116, appearing on line 110 are shown together with the distinctively delayed pulse outputs 117 from such meter installations. Output pulse 118 may represent the delayed output of core winding 111, for example, during one interrogation, and it will be noted that it is absent at time position 119 during the next-succeeding interval, thereby characterizing that consumer load 112 had not used the predetermined increment of energy in the 15-second interval considered.

According to another practice, represented by the circuitry of FIGURE 9, individual ferrite core elements, such as 120 and 121, each employed in different meter installations 122 and 123, respectively are intercoupled in shift register circuit relationship. A series of interrogation pulses, equal in number to the number of meter installations in one section, is applied to the interrogation windings, such as windings 124 and 125, over line 126 from the associated section equipment, at a repetition rate of 15 seconds for the entire series. Each core is in either the "0" or "1" state, depending upon whether the associated meter unit switching device, such as devices 127 and 128, has energized one of its windings, 129 and 130, respectively, in response to consumer load use of the predetermined increment of energy. Immediately upon the application of the first of the series of interrogation pulses, all the ferrite cores in one section of meter installations are caused to be in the "0" magnetization state. If the first of the intercoupled series of cores (not shown) were in the "1" state before this, its flip to the "0" state resulted in an output pulse being developed by its output winding, corresponding to winding 131, and thereby charging a capacitor through a diode, corresponding to capacitor 132 and diode 133, respectively. This capacitor then discharges and flips the core of the second meter, through a line and winding corresponding to the illustrated line and winding 134 and 135, respectively. The second core is flipped slowly, such that its associated capacitor is not charged in the process. The next interrogation pulse of the series shifts the "1" state information from the second to the third core in the same manner, and so on. Therefore, for a full series of one hundred meter installations, the first interrogation pulse occasions a readout pulse to output line 136 from the output winding 137 of the last meter installation 123, depending upon whether its loads had yet used another increment of energy, the state of the next-to-the-last core 120 is then transferred to the last core 121, the second interrogation pulse then reads out the last core, the state of which corresponds to the original state of the next-to-the-last core 120, and so forth until the one hundred interrogation pulses have read out the one hundred meter installations in the interrogation interval. Alternatively, an additional ferrite core may be employed in known circuit relationship between successive meter installations, in lieu of the illustrated combination of a diode and capacitor to shift one core state to the next core. The resulting train of output pulses provides binary characterization of the metered conditions in accordance with presence or absence of output pulses as the interrogation pulses are applied.

In FIGURE 10, the distinctive responses of meter installations are automatically produced in sequence in the manner of a chain reaction following the occurrence of each of a pair of periodic interrogation pulses, which include first a positive and then a negative pulse and which occur in immediate succession at the aforesaid 15-second periodicity, for example. These pulse pairs appear on the interrogation line 138. In meter installation 139, the ferrite core 140 is originally in a "0" or "1" magnetization state, depending upon whether or not the switching device 141 has responded to load use of an increment of energy. The interrogation pulses applied to interrogation winding 142 will then either change the magnetization state from "1" to "0," if an increment of energy has been used, or from "0" to "1" and then back from "1" to "0" if an increment of energy has not been used. Output winding 143 therefore delivers to the output line 144 either a pulse of one polarity, indicating use of an increment of energy, or a pair of closely-spaced pulses of opposite polarity to indicate that an increment of energy has not been used. These are readily discriminated by section equipment or a reading center, of the character earlier described herein, to provide and use a binary identification of the energy consumption. A delay line 145, which may be of a known form, preferably transistorized, also responds to the core change from the "1" to "0" state, and, after introducing a delay sufficient for the output pulse information from core 140 to be reported back to the reading center, triggers a pulse generator 146, also preferably transistorized, to produce a subsequent pair of pulses of first one and then another polarity in line 147. Line 147 corresponds to interrogation line 138 and feeds the interrogation winding of the next-succeeding meter installation. Each of these meter installations therefore reacts to the output of the next-preceding installation to deliver its distinctive pulse-coded output to the common output line.

It should be understood that the embodiments of this invention disclosed herein are intended to be of a descriptive rather than a limiting character and what various changes, combinations, substitutions or modification may be practiced in accordance with these teachings without departing either in spirit or scope from this invention in its broader aspects.

What I claim as new and desire to secure by Letters Patent of the United States is:

1. Automatic metering apparatus comprising a meter installation including a meter unit having an output member the movements of which are related to the supply of electrical energy to a consumer load by service mains and having a predetermined maximum capacity for measuring the rate of the supply to the load, whereby only one predetermined amount of the supply which represents an acceptable resolution in measurement of the supply to the load can be measured through said meter unit within a predetermined period, switching means actuated between two switching states by successive movements of said output member which are each related to the passage of said predetermined amount of supply to the load through said meter unit, generator means remote from said meter installation producing successive electrical interrogation signals recurring at a periodicity equal to said predetermined period, a communication link applying said recurring interrogation signals to said meter installation, electrical signalling means forming a part of said meter installation coupled with said communications link and controlled by said switching means exhibiting in said communication link responsive to said interrogation signals different electrical output characteristics when said switching means is in different ones of said switching states, and means remote from said meter installation recording the changes in said output characteristics appearing in said communication link.

2. Automatic metering apparatus comprising a meter installation including switching means and an integrating meter unit actuating said switching means between two switching states responsive to successive integrations of a predetermined amount of a supply of electrical energy to a consumer load from service mains through said meter unit, said predetermined amount of the supply representing an acceptable resolution in measurement of the supply to the load, and said meter unit having a predetermined maximum capacity for measuring the rate of the supply to the load, whereby only one said predetermined amount of the supply can be measured through said meter unit within a predetermined period, generator means remote from said meter installation producing successive electrical interrogation signals recurring at a periodicity equal to said predetermined period, a communication link applying said recurring interrogation signals to said meter installation, electrical signalling means in said meter installation coupled with said communication link and controlled by said switching means and exhibiting in said communication link responsive to said interrogation signals different electrical output characteristics when said switching means is in different ones of said switching states, and means remote from said meter installation recording the supply to the consumer load in accordance with changes in said output characteristics appearing in said communication link.

3. Automatic metering apparatus comprising a plurality of meter installations each including switching means and an integrating meter unit actuating said switching means between two switching states responsive to successive integrations of a predetermined amount of a supply of electrical energy to a different consumer load from service mains through said meter unit, said predetermined amount of the supply representing an acceptable resolution in measurement of the supply to consumer loads, and said meter unit having a predetermined maximum capacity for measuring the rate of the supply to the loads, whereby only one said predetermined amount of the supply can be passed to any load through any one of the meter units within a predetermined period, generator means remote from said meter installations producing successive electrical interrogation signals recurring at intervals equal to said predetermined period, a communication link applying said recurring interrogation signals to said meter installations, electrical signalling means in each meter installation coupled with said communication link and controlled by the switching means of the installation and exhibiting in said communication link responsive to said interrogation signals different electrical output characteristics when said switching means of the installation is in one of said switching states and when said meter unit has actuated said switching unit to the other of said switching states, each of said signalling means exhibiting its output characteristics in said communication link within a distinctive portion of the intervals between successive interrogation signals, and means coupled with said communication link remotely from said meter installations recording the supply to each of the consumer loads in accordance with changes in said output characteristics appearing in said communication link within said distinctive portions of the intervals between successive interrogation signals.

4. Automatic metering apparatus as set forth in claim 3 wherein said generating means comprises a sweep-frequency generator producing recurring interrogation signals having the same changes in frequency with time during the successive interrogation intervals, and wherein each of said electrical signalling means is tuned to exhibit its output characteristics responsive only to appearances of substantially one frequency in said successive interrogation signals which is different from other frequencies in said interrogation signals and which is different from the frequencies to which the others of said signalling means are tuned.

5. Automatic metering apparatus as set forth in claim 3 wherein each said meter unit comprises an electrical induction watthour meter motor having a disk rotated at an angular velocity proportional to the electrical energy supplied to the consumer electrical load by electric service mains, wherein each said switching means is actuated between said switching states responsive to each successive rotation of said disk of the meter motor in the same installation by a predetermined angular amount, wherein said predetermined amount of supply is substantially 200 watthours, and wherein said communication link comprises a single wired line connecting the electrical signalling means in said installations with said generating means and said recording means.

6. Automatic metering apparatus as set forth in claim 3 wherein each said meter unit comprises an electrical induction watthour meter motor having a disk rotated at an angular velocity proportional to the electrical energy supplied to the consumer electrical load by electric service mains, wherein each said switching means comprises electrical contacts opened and closed in response to rotations of said disk by a predetermined angular amount, wherein said predetermined period is substantially fifteen seconds, and wherein said generating means produces said electrical interrogation signals periodically within successive fifteen-second intervals.

7. Automatic metering apparatus comprising a plurality of meter installations each including an electrical induction watthour meter motor having a disk rotated at an angular velocity proportional to the electrical energy supplied to a consumer electrical load from electrical service mains through said meter motor, different electrical contacts in each one of said installations actuated to open and close in response to rotations of the disk in the installation by a predetermined angular amount occasioned by the supply of a predetermined increment of energy to the load associated with the meter installation, sweep-frequency generator means remote from said meter installation producing successive electrical interrogation signals each having the same predetermined changes in frequency with time and recurring at predetermined intervals less than the shortest interval within which a consumer load can consume more than one said predetermined increment of energy, an electrical communication link applying said interrogation signals to said meter installations, electrical signalling means in each meter installation coupled with said communication link and coupled in circuit with said electrical contacts in the meter installation and exhibiting in said communication link responsive to said interrogation signals different electrical output characteristics when said contacts are in one of the closed or opened conditions and when said meter motor has actuated said contacts to the other of said conditions, each of said signalling means being tuned to exhibit its output characteristics to said communication link responsive only to appearances of substantially one frequency in said interrogation signals which is different from other frequencies in said interrogation signals and which is different from the frequencies to which the others of said signalling means are tuned, and means coupled with said communication link remotely from said meter installations recording the supply of said predetermined increment of energy to each of the consumer loads in accordance with changes in said output characteristics appearing in said communication link at times related to the times at which the interrogation signals are of the frequencies to which the respective signalling means are tuned.

8. Automatic metering apparatus as set forth in claim 7 wherein said electrical signalling means in each of said meter installations comprises frequency-sensitive means tuned to a predetermined natural resonance frequency and coupled into said communication link to introduce a relatively high impedance into said communication link at said predetermined frequency, and means coupled in electrical circuit relationship with said contacts and in electrical circuit relationship with said frequency-sensitive means exhibiting a relatively low impedance to said communication link at said predetermined frequency when said contacts are in one of said open or closed conditions.

9. Automatic metering apparatus as set forth in claim 8 wherein said communication link comprises a single wired line coupling each of said meter installations with said generator means and with said recording means, each of said frequency-sensitive means comprising a parallel-tuned circuit in series electrical connection with said line and with the tuned circuits of the other of said meter installations, and wherein said means exhibiting a relatively low impedance at said predetermined frequency comprises an electrical impedance element, and means connecting the series combination of said contacts and impedance element in each meter installation in parallel with said tuned circuit in that installation.

10. Automatic metering apparatus as set forth in claim 8 wherein said communication link comprises a single wired line coupling each of said meter installations with said generator means and with said recording means, each of said frequency-sensitive means comprising a series tuned circuit in series electrical connection with said line and with the tuned circuits of the other of said meter installations, and wherein said means exhibiting a relatively low impedance at said predetermined frequency comprises an electrical impedance element, and means connecting the series combination of said contacts and said impedance element in each meter installation in parallel with said series tuned circuit in that installation.

11. Automatic metering apparatus as set forth in claim 9 wherein each said electrical impedance element is resistive, and wherein the high impedance of each said tuned circuit at the predetermined natural resonance frequency thereof and the impedance of the parallel combination of each said tuned circuit and said resistive impedance element at the same predetermined natural frequency thereof are both higher than the maximum total impedances which can be exhibited to the line by all of the other signalling means in the other meter installations at that predetermined frequency.

12. Automatic metering apparatus as set forth in claim 7 wherein each said signalling means comprises an electrical filter coupled with said link to receive said interrogation signals and tuned to produce an output responsive to a predetermined narrow band of frequencies in said interrogation signals, a bistable electrical device including means for electrically switching said device to either of two stable electrical conditions and means producing an electrical output signal when said device is switched from one to the other of said stable conditions, means applying said filter output to said switching means of said bistable device to leave said bistable device in said other stable condition, means applying electrical energy to said switching means of said bistable device through said electrical contacts to switch said bistable device to said one stable condition when said meter motor actuates said contacts between said open and closed conditions, and means coupling said means producing an electrical output signal into said communication link.

13. Automatic metering apparatus comprising a meter unit having an output member the movements of which are related to the supply of electrical energy to a consumer load by service mains, said meter unit having a predetermined maximum capacity for measurement of the rate of the supply to the load, whereby only one predetermined amount of the supply which represents an acceptable resolution in measurement of the supply to the load can be measured through said meter unit within a predetermined period, switching means actuated between two switching states by successive movements of said output member which each characterize the passage of said predetermined amount of supply to the load through said meter unit, electrical signalling means for exhibiting either of two electrical output characteristics in response to each of applied successive electrical interrogation signals recurring at intervals equal to said period, means connecting said switching means in a circuit relationship with said signalling means which preserves one of said output characteristics when said switching means is in one of said states and which establishes the other of said output characteristics when said switching means has been actuated to the other of said states by said meter unit, and means for coupling electrical interrogation signals recurring at said intervals from a communication link to said signalling means and for applying said output characteristics of said signalling means to the communication link.

14. Automatic metering apparatus comprising an electrical induction watthour meter motor unit having a disk rotated at an angular velocity proportional to the electrical energy flowing between electric service connections and consumer load connections thereof, said meter motor unit having a predetermined maximum capacity for measurement of the rate of flow of the electrical energy therethrough, whereby only one predetermined watthour increment of energy which represents an acceptable resolution in measurement of energy supplied to a load can be measured through said meter unit within a predetermined period, switching means actuated between two switching states responsive to each successive rotation of said disk by a predetermined angular amount which characterizes the flow of energy equal to said predetermined increment, electrical signalling means for exhibiting either of two electrical output characteristics in response to each of applied successive electrical interrogation signals recurring at intervals equal to said period, means connecting said switching means in a circuit relationship with said signalling means which preserves one of said output characteristics when said switching means is in one of said states and which establishes the other of said output characteristics when said switching means has been actuated to the other of said states by said disk, and means for coupling electrical interrogation signals recurring at said intervals from a communication link to said signalling means and for applying said output characteristics of said signalling means to the communication link.

15. Automatic metering apparatus as set forth in claim 14 wherein said predetermined period and said predetermined interval are substantially fifteen seconds, wherein said predetermined increment is about 200 watthours, wherein said switching means comprises electrical contacts opened or closed in response to said rotations of said disk by said predetermined angular amount, and wherein said electrical signalling means is electrically tuned to exhibit said output characteristics to said coupling means responsive only to appearances of substantially one predetermined frequency in the interrogation signals from said coupling means.

16. Automatic metering apparatus as set forth in claim 14 wherein said electrical signalling means comprises frequency-sensitive means tuned to a predetermined frequency to introduce a relatively high impedance into said coupling means at said predetermined frequency, and means coupled in electrical circuit relationship with said switching means and in electrical circuit relationship with said frequency-sensitive means exhibiting a relatively low impedance to said communication link at said predetermined frequency when said switching means are in one of said two switching states.

17. Automatic metering apparatus as set forth in claim 14 wherein said signalling means comprises an electrical filter coupled with said coupling means to receive the interrogation signals from the communication link and tuned to produce an output responsive to a predetermined narrow band of frequencies of the interrogation signals, a bistable electrical device including means for electrically switching said device to either of two stable electrical conditions and means producing an electrical output signal when said device is switched from one to the other of said stable conditions, means applying said filter output to said switching means of said bistable device to leave said bistable device in said other stable condition, and means applying electrical energy to said switching means of said bistable device through said first switching means to switch said bistable device to said one stable condition when said first switching means is actuated between said two switching states.

18. Automatic metering apparatus comprising a plurality of meter installations, each including an integrating meter unit and switching means, said meter unit comprising an electrical induction watthour meter motor having a disk rotated at an angular velocity proportional to the electrical energy supplied to a consumer electrical load from service mains through said meter unit, said switching means being actuated between two switching states responsive to successive rotation of said disk of said meter motor by a predetermined angular amount representing successive integrations of a predetermined amount of electrical energy supplied to the load, said predetermined amount of electrical energy representing an acceptable resolution in measurement of electrical energy to loads, said meter having a predetermined capacity for measuring the rate of electrical energy supplied to loads whereby only one said predetermined amount of electrical energy can be passed to any load through any one said meter unit within a predetermined period, generator means remote from said meter installations producing successive electrical interrogation signals recurring at intervals equal to said predetermined period, a communication link applying said signals to said meter installations, said communication link comprising a single wired line connecting said meter installations with said generator means, electrical signalling means in each meter installation coupled to said communication link and controlled by said switching means of the installation and exhibiting in said communication link responsive to said interrogation signals different electrical output characteristics when said switching means of the installation is in one of said switching states and when said switching means is in the other of said switching states, each of said signalling means exhibiting its output characteristics in said communication link within a distinctive portion of the interval between successive interrogation signals, and means coupled with said communication link remote from said meter installations recording the amount of electrical energy supplied to each consumer load in accordance with changes in said output characteristics appearing in said communication link.

References Cited by the Examiner

UNITED STATES PATENTS

| | | | |
|---|---|---|---|
| 1,902,465 | 3/33 | Pratt | 346—34 |
| 1,933,996 | 11/33 | Paris | 346—34 |
| 2,207,743 | 7/40 | Larson | 346—34 |
| 2,942,243 | 6/60 | Bilz | 340—182 |

WALTER L. CARLSON, *Primary Examiner.*

FREDERICK M. STRADER, ELI J. SAX, *Examiners.*